US012354359B2

(12) United States Patent
Okamoto (10) Patent No.: US 12,354,359 B2
(45) Date of Patent: Jul. 8, 2025

(54) INFORMATION PROCESSING SYSTEM, CONTROL METHOD OF THE SYSTEM, AND STORAGE MEDIUM

(71) Applicant: CANON KABUSHIKI KAISHA, Tokyo (JP)

(72) Inventor: Yoshihiko Okamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 17/678,864

(22) Filed: Feb. 23, 2022

(65) Prior Publication Data
US 2022/0270372 A1 Aug. 25, 2022

(30) Foreign Application Priority Data
Feb. 25, 2021 (JP) ................. 2021-028814

(51) Int. Cl.
*G06K 9/00* (2022.01)
*G06F 18/214* (2023.01)
*G06T 7/70* (2017.01)
*G06V 20/52* (2022.01)

(52) U.S. Cl.
CPC ............ *G06V 20/52* (2022.01); *G06F 18/214* (2023.01); *G06T 7/70* (2017.01); *G06T 2207/20081* (2013.01); *G06T 2207/20084* (2013.01); *G06T 2207/30196* (2013.01); *G06T 2207/30232* (2013.01)

(58) Field of Classification Search
CPC ........... G06T 2207/30196; G06T 2207/30232; G06V 20/52; G06V 10/82; G06V 40/172
See application file for complete search history.

(56) References Cited

U.S. PATENT DOCUMENTS

| 10,389,982 | B1 * | 8/2019 | Fu ........................ H04N 7/185 |
| 10,389,983 | B1 * | 8/2019 | Fu ........................ H04N 7/181 |
| 10,402,989 | B2 * | 9/2019 | Modestine ........... H04N 23/661 |
| 10,497,236 | B2 * | 12/2019 | Lemberger ....... G08B 13/19606 |
| 10,635,303 | B2 * | 4/2020 | Coffman ............... G06F 3/1454 |
| 2016/0267760 | A1 * | 9/2016 | Trani ...................... G07C 9/28 |
| 2017/0214801 | A1 * | 7/2017 | Gaspard .................. H04L 51/52 |
| 2017/0359189 | A1 * | 12/2017 | Smith .................... G05B 15/02 |
| 2018/0365920 | A1 * | 12/2018 | Daly .................. G07C 9/00309 |
| 2019/0018588 | A1 * | 1/2019 | DeBates ............... G06F 3/0482 |
| 2019/0068792 | A1 * | 2/2019 | Gaspard ............. H04M 1/2473 |
| 2019/0089934 | A1 * | 3/2019 | Goulden .................. G08B 7/06 |
| 2019/0130175 | A1 * | 5/2019 | Nakashima .......... G06V 40/174 |
| 2019/0278976 | A1 * | 9/2019 | Khadloya ........ G08B 13/19656 |
| 2020/0082198 | A1 * | 3/2020 | Yao .................. G06F 18/24143 |

(Continued)

FOREIGN PATENT DOCUMENTS

| JP | 2019046018 A | 3/2019 |
| JP | 2019068360 A | 4/2019 |
| JP | 2020184657 A | 11/2020 |

*Primary Examiner* — Hadi Akhavannik
(74) *Attorney, Agent, or Firm* — Canon U.S.A., Inc., IP Division (57) ABSTRACT

An information processing system includes an image capturing unit that captures an image of a visitor, an acquisition unit that acquires information about a response to a visit of the visitor, and a training data generation unit that generates training data for a learning model by using the image of the visitor captured by the image capturing unit and the information about the response acquired by the acquisition unit.

19 Claims, 10 Drawing Sheets

(56) References Cited

U.S. PATENT DOCUMENTS

| | | | |
|---|---|---|---|
| 2020/0184053 A1* | 6/2020 | Kursun | G06V 10/764 |
| 2020/0293756 A1* | 9/2020 | Ainsworth | G06F 18/22 |
| 2021/0043018 A1* | 2/2021 | Zhang | G07C 9/00571 |
| 2022/0270372 A1* | 8/2022 | Okamoto | G06F 18/214 |

* cited by examiner

| LEARNING DATA ID | INPUT DATA | | | | | TRAINING DATA | |
| --- | --- | --- | --- | --- | --- | --- | --- |
| | FACE | BODY TYPE | CLOTHING | VOICE | TIME | RESPONSE | UNLOCKING |
| 1 | --- | SMALL BUILD | CASUAL | --- | 2020/3/6 6:03 | NOT RESPOND | UNLOCK |
| 2 | --- | MEDIUM BUILD | CASUAL | --- | 2020/3/6 11:37 | NOT RESPOND | NOT UNLOCK |
| 3 | --- | LARGE BUILD | UNIFORM | --- | 2020/3/6 13:22 | RESPOND | UNLOCK |
| 4 | --- | SLENDER TALL | SUIT | --- | 2020/3/6 16:40 | RESPOND | NOT UNLOCK |
| ... | ... | ... | ... | ... | ... | ... | ... |

INFORMATION PROCESSING SYSTEM, CONTROL METHOD OF THE SYSTEM, AND STORAGE MEDIUM

BACKGROUND

Field

The present disclosure relates to a system that determines a subject captured in a video.

Description of the Related Art

Recently, there has been known a technique for inferring a subject using artificial intelligence (AI) based on video information and audio information.

Training data is required to train the AI, and the following technique is an example of a known method for generating training data. Japanese Patent Application Laid-Open No. 2019-046018 discusses a technique for automatically sorting a target sound from audio information acquired by a sound collection device using AI. In the method discussed in Japanese Patent Application Laid-Open No. 2019-046018, a user inputs an audio type to input data. However, according to Japanese Patent Application Laid-Open No. 2019-046018, a person needs to perform annotation work to input the audio type to the input data each time in order to generate training data. Since a large amount of data is required to train the AI, there is an inconvenience that a user who uses the system needs to manually perform such annotation work, which creates a heavy burden on the user.

SUMMARY

According to an aspect of the present disclosure, an information processing system includes an image capturing unit configured to capture an image of a visitor, an acquisition unit configured to acquire information about a response to a visit of the visitor, and a training data generation unit configured to generate training data for a learning model by using the image of the visitor captured by the image capturing unit and the information about the response acquired by the acquisition unit.

Further features will become apparent from the following description of exemplary embodiments with reference to the attached drawings.

DESCRIPTION OF THE EMBODIMENTS

Exemplary embodiments will be described in detail below with reference to the attached drawings. These exemplary embodiments are not seen to limit the scope of the enclosed claims. While a plurality of features is described in the exemplary embodiments, all of the plurality of features are not always essential to implementing the embodiments, and the plurality of features can be combined in any manner that would enable practice of the embodiments. The same or similar configurations are denoted by the same reference numerals in the attached drawings, and duplicate descriptions are omitted.

System Configuration

Figure 1:
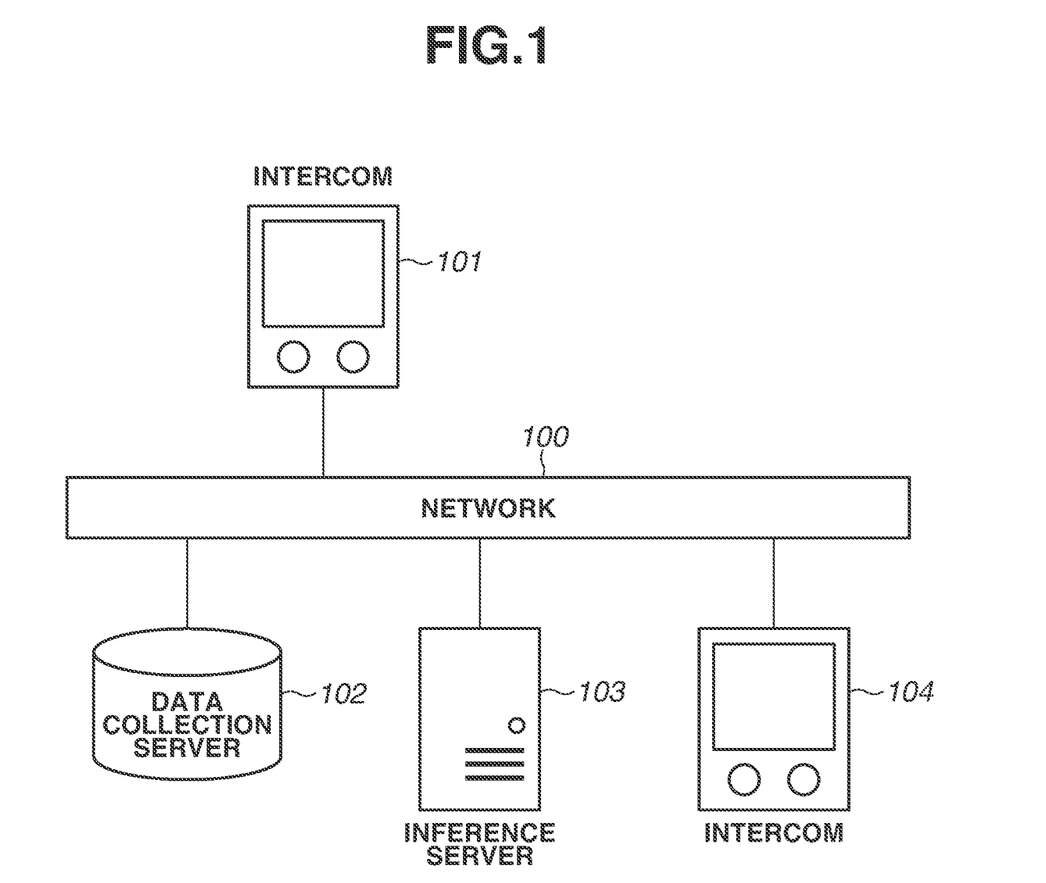
FIG. 1 is a system diagram illustrating an intercommunication system according to an exemplary embodiment.

A first exemplary embodiment will now be described. FIG. 1 is a system diagram illustrating an example of an intercommunication system according the present embodiment. The intercommunication system illustrated in FIG. 1 includes a network 100, an intercommunication device (intercom) 101, a data collection server 102, an inference server 103, and an intercom 104.

The intercom 101, the data collection server 102, the inference server 103, and the intercom 104 are connected to the network 100 and can communicate with each other via the network 100. The network 100 includes a communication line, and can be implemented in any method that would enable practice of the present embodiment. The network 100 can be connected to, for example, a smartphone and/or a home electrical appliance, which are not illustrated, and can be configured to be remotely accessed by a user.

A residence (housing complex) will be used for discussion purposes as specific use example of the system according to the present exemplary embodiment. Any environment that would enable practice of the present embodiment is applicable. The intercom 101 installed in a residence acquires video information about a visitor and notifies the resident of the visitor's presence by displaying video of the visitor on a notification unit of the intercom 101. The resident confirms the video of the visitor displayed on the notification unit of the intercom 101 and determines whether to respond to the visitor. In a case where the resident responds to the visitor, the resident operates the intercom 101 to perform voice communication with the visitor and, if necessary, operates the intercom 101 to, for example, select whether to open a door to let the visitor enter the residence.

The video information and audio information associated with the visitor, response information about the response to the visitor, and unlocking/locking information about whether a door is unlocked acquired by the intercom 101 are stored in the data collection server 102 via the network 100 and input to the inference server 103. The inference server 103 executes inference processing using the video information and the audio information associated with the visitor received from the intercom 101 as input data and transmits a result of the inference processing to the intercom 101 via the network 100. The inference processing is described in detail below. The inference server 103 generates training data from the response information associated with the response to the visitor and the unlocking/locking information about whether the door is unlocked received from the intercom 101. Generation of the training data is described in detail below.

The result of the inference processing performed by the inference server 103 and the training data generated by the inference server 103 can be shared with an intercom 104 of another residence.

As described above, according to the present exemplary embodiment, the inference server 103 executes the inference processing using the video information and the audio information associated with the visitor acquired by the intercom 101 as the input data by using the system. The intercom 101 receives the inference result of the inference server 103 indicating who the visitor is and can thus provide support to the resident to assist in the resident in determining whether to respond to the visitor and whether to unlock the door.

Hardware Configuration

Figure 2:
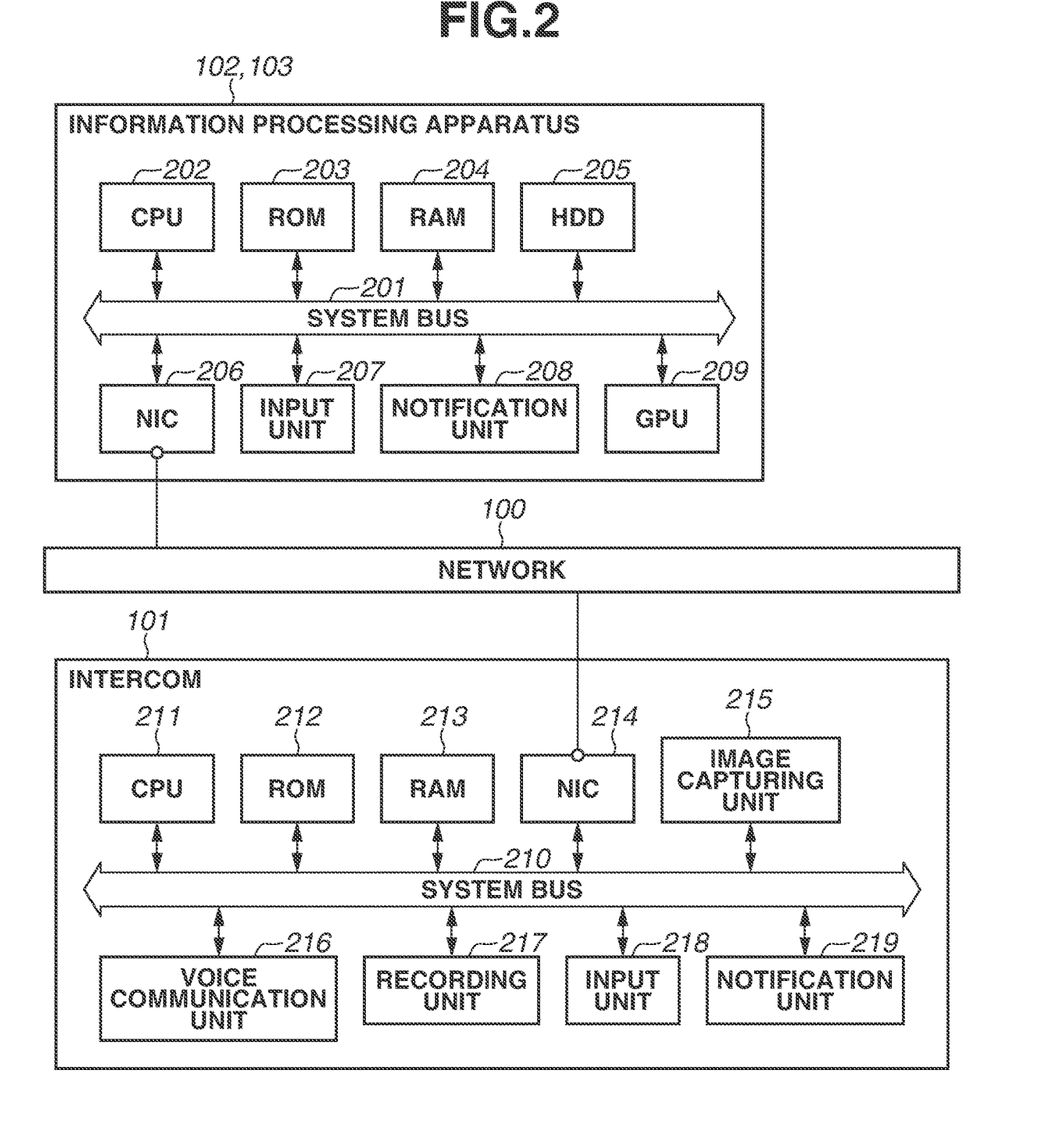
FIG. 2 is a block diagram illustrating a hardware configuration of the intercommunication system according to an exemplary embodiment.

FIG. 2 illustrates examples of hardware resources of each device included in the system in FIG. 1.

The data collection server 102 and the inference server 103 can have the same configuration, as such, they are collectively described herein as an information processing apparatus. The information processing apparatus includes a system bus 201, a central processing unit (CPU) 202, a read-only memory (ROM) 203, a random access memory (RAM) 204, a hard disk drive (HDD) 205, and a network interface card (NIC) 206. The information processing apparatus also includes an input unit 207, a notification unit 208, and a graphical processing unit (GPU) 209.

The system bus 201 is connected to the CPU 202, the ROM 203, the RAM 204, the HDD 205, the NIC 206, the input unit 207, the notification unit 208, and the GPU 209, and these elements can exchange data with each other via the system bus 201.

The CPU 202 is connected to the ROM 203, the RAM 204, the HDD 205, the NIC 206, the input unit 207, the notification unit 208, and the GPU 209 via the system bus 201 and performs control of all these units. In the following descriptions, unless otherwise specified, the CPU 202 is the main hardware that executes a program, and the main software is a program stored in the ROM 203 or the HDD 205.

The ROM 203 stores a program to be executed by the CPU 202 to control each unit in the information processing apparatus and information such as a parameter related to processing performed by each unit.

The RAM 204 is a rewritable memory and is used as a work area by the CPU 202 in executing a program stored in the ROM 203.

The HDD 205 is a storage medium that stores a program to be executed by the CPU 202 to control each unit in the information processing apparatus and also stores the video information, the audio information, the response information about the response to the visitor, and the unlocking/locking information about whether the door is unlocked transmitted from the intercom 101 via the network 100. The HDD 205 also stores training data to be used for learning processing and a trained model as a product generated as a result of the learning processing described below.

The NIC 206 connects the information processing apparatus to the network 100. A network connection can be established by using either a wired local area network (LAN) or a wireless LAN (WLAN). The CPU 202 executes processing for controlling communication with another device connected thereto via the network 100 by controlling the NIC 206.

The input unit 207 receives each input operation provided by a user to the information processing apparatus. The user can perform various settings on the information processing apparatus via the input unit 207. The input unit 207 is an input device for receiving an operation from a user, including, for example, a character information input device such as a keyboard, a pointing device such as a mouse and a touch panel, a button, a dial, a joystick, a touch sensor, and a touch pad.

The notification unit 208 is, for example, a display that displays an icon and the like for a user operation.

The notification unit 208 displays a graphical user interface (GUI) based on an instruction from the CPU 202.

The GPU 209 is a multi-core calculating device that can perform an operation based on an instruction from the CPU 202 or in cooperation with the CPU 202.

The intercom 101 includes a system bus 210, a CPU 211, a ROM 212, a RAM 213, a NIC 214, an image capturing unit 215, a voice communication unit 216, a recording unit 217, an input unit 218, and a notification unit 219.

The system bus 210 is connected to the CPU 211, the ROM 212, the RAM 213, the NIC 214, the image capturing unit 215, the voice communication unit 216, the recording unit 217, the input unit 218, and the notification unit 219. Each unit can exchange data with each other via the system bus 210.

The CPU 211 is connected to the ROM 212, the RAM 213, the NIC 214, the image capturing unit 215, the voice communication unit 216, the recording unit 217, the input unit 218, and the notification unit 219 via the system bus 210 and performs control of all these units. In the following descriptions, unless otherwise specified, the CPU 211 is a main hardware component that executes a program, and a main software component is a program stored in the ROM 212 or the recording unit 217.

The ROM 212 stores a program to be executed by the CPU 211 to control the intercom 101 and information such as a parameter related to processing of each unit.

The RAM 213 is a rewritable memory and is used as a work area by the CPU 211 in executing a program stored in the ROM 212.

The NIC 214 connects the intercom 101 to the network 100. The network connection may be established by using either the wired LAN or the wireless LAN. The CPU 211 executes processing for controlling communication with the other device connected via the network 100 by controlling the NIC 214.

The image capturing unit 215 includes an optical lens, an image capturing element, and an image processing unit. Video information captured by the image capturing unit 215 is temporarily stored in the RAM 213 and recorded on the recording unit 217 based on an instruction from the CPU 211. The image capturing unit 215 performs control such as zooming, focusing, and setting an aperture value based on an instruction from the CPU 211. The optical lens is a lens group including a zoom lens and a focus lens. The image capturing element includes a charge coupled device (CCD) sensor or a complementary metal oxide semiconductor (CMOS) sensor converts an optical image into an electrical signal. The image processing unit can perform various types of image processing on moving image information and still image information stored in the RAM 213 and the recording unit 217 based on control by the CPU 211. The image processing unit can discriminate face information and body type information of a subject and clothing information about the clothing that the subject is wearing, and the CPU 211 stores the extracted face information, body type information, and clothing information of the subject in the recording unit 217. The image processing to be executed by the image processing unit includes analog-to-digital (A/D) conversion processing, digital-to-analog (D/A) conversion processing, and encoding processing, compression processing, decoding processing, resizing processing, noise reduction processing, and color conversion processing to be performed on moving image information and still image information. The image processing unit can be configured to include a dedicated circuit block for performing specific image processing. Depending on a type of image processing, the CPU 211 can perform the image processing based on a program without using the image processing unit. The video information acquired by the image capturing unit 215 can include audio information.

The voice communication unit 216 includes a microphone, a speaker, and an audio processing unit. Audio information acquired by the voice communication unit 216 is temporarily stored in the RAM 213 and recorded on the recording unit 217 based on an instruction from the CPU 211. The audio processing unit can discriminate a voice of a target person, and the CPU 211 stores voice information of the subject together with the video information about the subject captured by the image capturing unit 215 in the recording unit 217.

The recording unit 217 is provided with a storage medium and records a program to be executed by the CPU 211 to control the intercom 101, the video information captured by the image capturing unit 215, and the audio information acquired by the voice communication unit 216 on the storage medium based on an instruction from the CPU 211. The recording unit 217 can store information about the subject that is acquired by image capturing. The storage medium can be, for example, a built-in storage medium such as a built-in flash memory and a built-in HDD, and an external storage medium such as a mountable/detachable memory card.

The input unit 218 receives each input operation given by a user to the intercom 101. Specifically, the input operation includes an operation of announcing a visit of a visitor, a response operation of selecting whether to respond to the visitor, and an unlocking or not unlocking operation of selecting whether to open the door. The user can perform various settings of the intercom 101 via the input unit 218. The input unit 218 is an input device, such as a button and a touch panel, for receiving input from a user. The CPU 211 can control the voice communication unit 216 to acquire a visitor's voice at the time when the visitor operates the input unit 218 to notify the resident of the visit. In this case, the CPU 211 can immediately transmit the acquired voice to the resident via the notification unit 219 or can perform control not to transmit the voice to the resident until the resident operates the input unit 218 to respond to the visitor.

The notification unit 219 is, for example, a display that displays an icon for a user operation and the video information captured by the image capturing unit 215. The display displays a GUI based on an instruction from the CPU 211. The notification unit 219 can output a confirmation sound and a warning sound for a user operation and a sound announcing the visit of the visitor from a speaker.

The intercom 104 has substantially the same hardware configuration as that of the intercom 101, so a description thereof is omitted herein.

Figure 3:
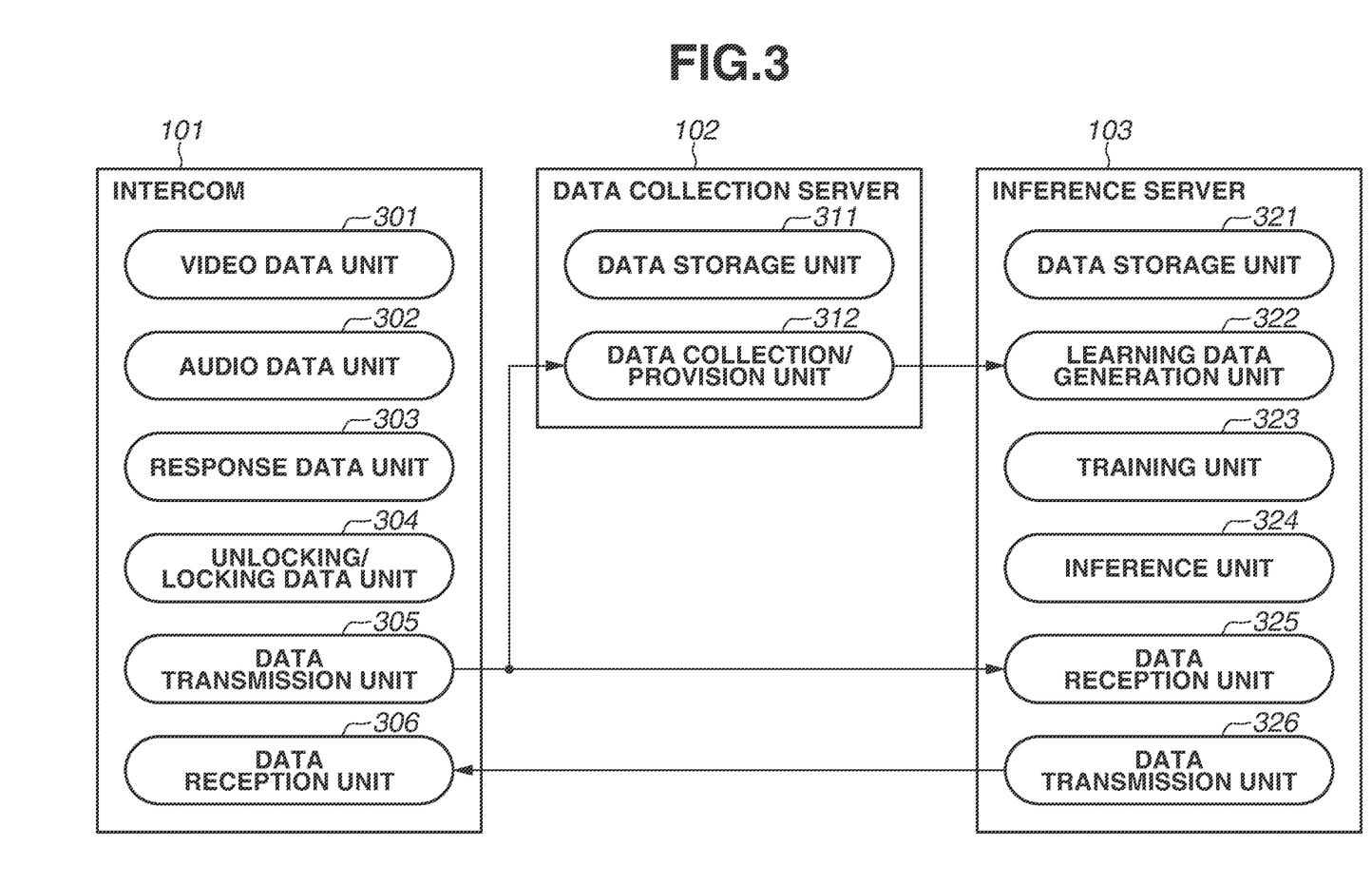
FIG. 3 is a block diagram illustrating a software configuration of the intercommunication system according to an exemplary embodiment.

FIG. 3 illustrates an example of a software configuration that is realized using the hardware resources illustrated in the hardware configuration diagram in FIG. 2 and a program.

First, a function block of the intercom 101 is described.

The CPU 211 realizes a function of each unit described below by executing a program stored in the ROM 212 or the recording unit 217 using the RAM 213 as the work area. In other words, the CPU 211 realizes functions of a video data unit 301, an audio data unit 302, a response data unit 303, an unlocking/locking data unit 304, a data transmission unit 305, and a data reception unit 306.

The video data unit 301 transmits the captured video information to the data collection server 102 and the inference server 103 via the data transmission unit 305.

The audio data unit 302 transmits the acquired audio information to the data collection server 102 and the inference server 103 via the data transmission unit 305.

The response data unit 303 transmits the acquired response information indicating a response status regarding whether the resident has responded to the visitor to the data collection server 102 and the inference server 103 via the data transmission unit 305.

The unlocking/locking data unit 304 transmits the acquired unlocking/locking information indicating an opened/closed status of the door to the data collection server 102 and the inference server 103 via the data transmission unit 305.

The data reception unit 306 receives the inference result transmitted from the inference server 103.

Next, a function block of the data collection server 102 is described.

The CPU 202 realizes functions of a data storage unit 311 and a data collection/provision unit 312 by executing a program stored in the ROM 203 or the HDD 205 using the RAM 204 as the work area.

The data storage unit 311 stores the video information, the audio information, the response information, and the unlocking/locking information transmitted from the intercom 101 and received by the data collection/provision unit 312 in the HDD 205.

The data collection/provision unit 312 receives the video information, the audio information, the response information, and the unlocking/locking information transmitted from the intercom 101. The data collection/provision unit 312 transmits the received video information and audio information to the inference server 103.

Next, a function block of the inference server 103 is described.

The CPU 202 realizes a function of each unit described below by executing a program stored in the ROM 203 or the HDD 205 using the RAM 204 as the work area. In other words, the CPU 202 realizes respective functions of a data storage unit 321, a learning data generation unit 322, a training unit 323, an inference unit 324, a data reception unit 325, and a data transmission unit 326.

The data storage unit 321 stores the video information, the audio information, the response information, and the unlocking/locking information transmitted from the intercom 101 and learning data generated by the learning data generation unit 322 in the HDD 205. The learning data includes input data and training data.

The learning data generation unit 322 generates the input data from the video information and the audio information transmitted from the data collection server 102. The learning data generation unit 322 generates the training data from the response information and the unlocking/locking information transmitted from the data collection server 102. A specific flow of the generating processing is described below.

The training unit 323 trains a learning model using the learning data generated by the learning data generation unit 322. In the training, the GPU 209 can efficiently perform a calculation by processing more data in parallel, and thus, in a case where training is performed a plurality of times using a learning model such as deep learning, it is effective to perform processing using the GPU 209. Therefore, according to the present exemplary embodiment, the GPU 209 is used for the processing performed by the training unit 323, in addition to the CPU 202. Specifically, in a case where a learning program including a learning model is executed, learning is performed by the CPU 202 and the GPU 209 collaborating to perform a calculation. In the processing performed by the training unit 323, a calculation can be performed by only the CPU 202 or the GPU 209. The inference unit 324 can use the GPU 209 as with the training unit 323.

The inference unit 324 is specifically artificial intelligence (AI) and is a learning model as a result of training by the training unit 323. The inference unit 324 performs the inference processing using the video information and the audio information transmitted from the intercom 101 as the input data. Specifically, the inference unit 324 infers whether a visitor is a reliable person using the face information, the body type information, the clothing information and the voice information about the visitor. The inference unit 324 stores a result of the inference processing in the data storage unit 321 and transmits the result to the intercom 101 via the data transmission unit 326.

Figure 4:
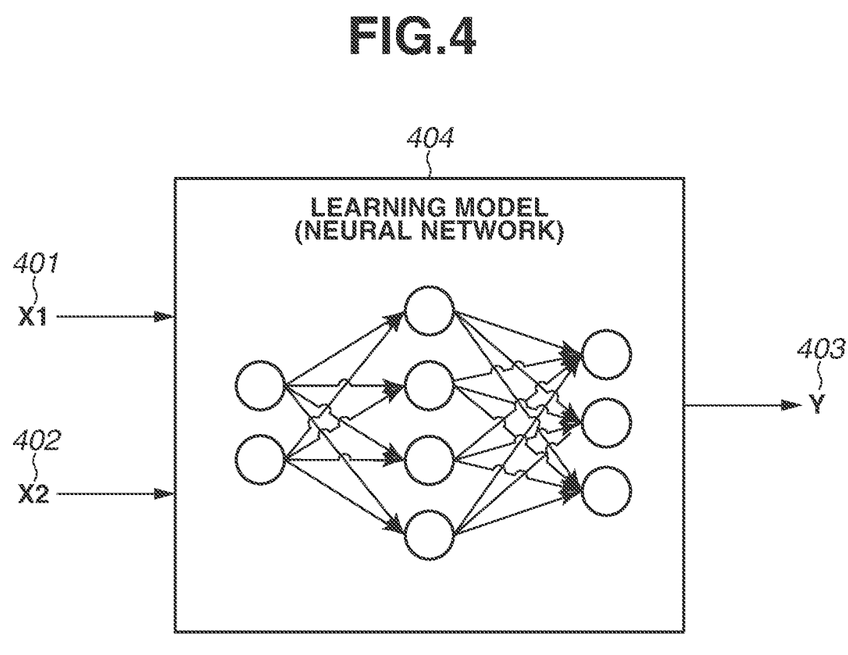
FIG. 4 is a diagram of a structure using a learning model including input data, the learning model, and output data according to an exemplary embodiment.

FIG. 4 is a diagram illustrating a structure of input and output using the learning model according to the present exemplary embodiment.

A learning model 404 is a learning model trained using machine learning. Examples of specific algorithms for machine learning include a nearest neighbor method, a naive Bayes method, a decision tree, and a support vector machine. The examples of the algorithms also include deep learning that generates itself a feature amount and a coupling weight coefficient for learning by using a neural network. A learning model trained by using an available algorithm from among the forgoing algorithms as appropriate can be applied to the present exemplary embodiment.

Two input data, input data X1 (401) that is the video information transmitted from the video data unit 301 and input data X2 (402) that is the audio information transmitted from the audio data unit 302 are used as input data to the learning model 404.

As output data from the learning model 404, output data Y (403) indicating reliability of the subject is output.

Figure 5:
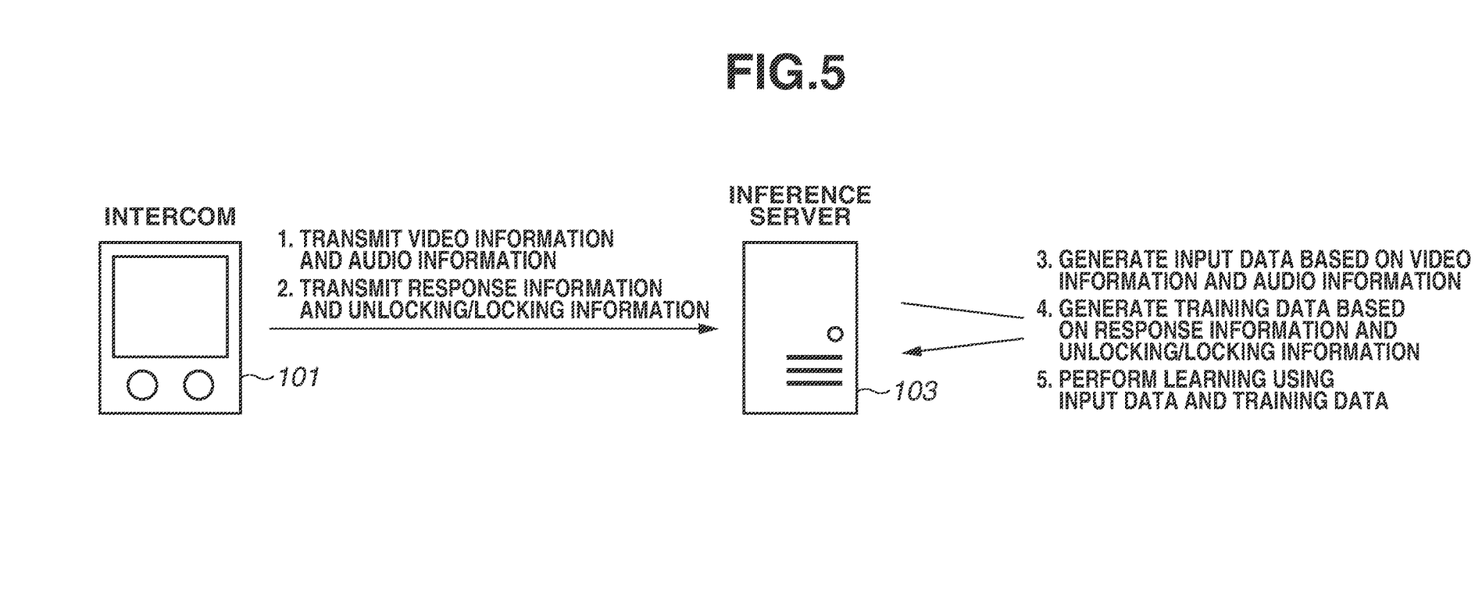
FIG. 5 is a diagram illustrating operations of the intercommunication system according to an exemplary embodiment.

FIG. 5 illustrates operations of a system according to the present exemplary embodiment that using the structure of the learning model illustrated in FIG. 4 can be applied. More specifically:
1. The intercom 101 transmits the video information about a visitor obtained by image capturing and the audio information obtained by a call with the visitor to the inference server 103 via the network 100.
2. The intercom 101 transmits the response information and the unlocking/locking information obtained in response to a user operation input to the input unit 218, to the inference server 103 via the network 100.
3. The input data of the learning data is generated based on the received video information and audio information.
4. The training data of the learning data is generated based on the received response information and unlocking/locking information.
5. The AI is trained by using the input data and the training data.

Performing the operations illustrated in FIG. 5 enable obtaining an effect that the training data can be automatically generated without an operation by a user.

FIGS. 6A to 6D are flowcharts illustrating detail flows of learning in a learning phase.

Figures 6A, 6B:
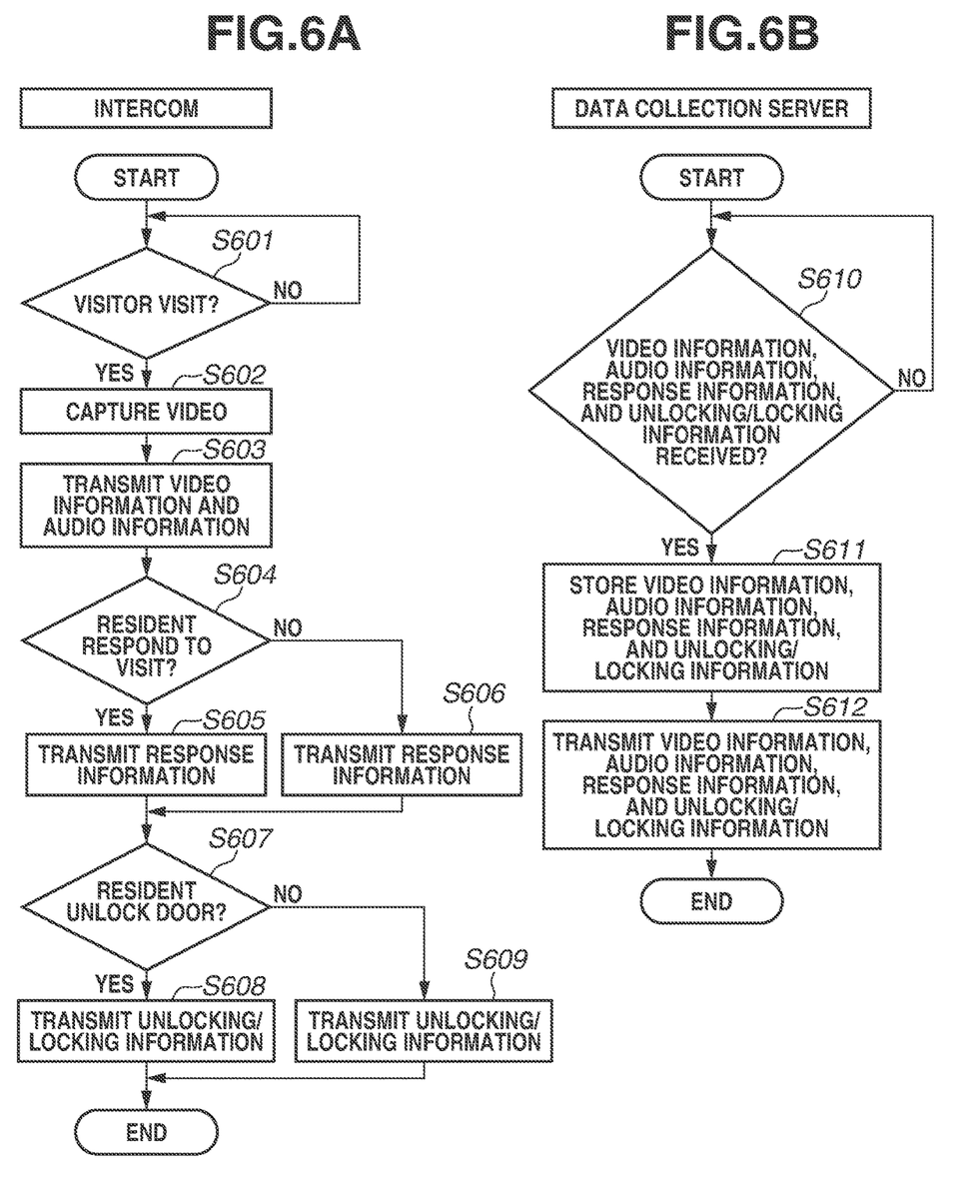
FIGS. 6A to 6D are flowcharts illustrating processing in a learning phase according to an exemplary embodiment.

First, a processing flow performed by the intercom 101 is described with reference to FIG. 6A. In the learning phase according to the present exemplary embodiment, the video information and the audio information acquired by the intercom 101 are used as the input data for learning, and the training data for learning is generated based on the response information and the unlocking/locking information.

In step S601, the CPU 211 determines whether a visitor operates the input unit 218 to notify a resident of the visit. In a case where the CPU 211 determines that a visitor operates the input unit 218 to notify a resident of the visit (YES in step S601), the CPU 211 controls the notification unit 219 to notify the resident of the visit of the visitor. In a case where the input unit 218 does not receive any operation from a visitor (NO in step S601), the CPU 211 continues to wait for an operation to be input to the input unit 218 by the visitor.

In step S602, the CPU 211 controls the image capturing unit 215 to capture a video of the visitor and controls the voice communication unit 216 to transmit a voice of the visitor to the resident. The CPU 211 records the acquired video information and audio information on the recording unit 217.

In step S603, the CPU 211 transmits the video information and the audio information recorded on the recording unit 217 in step S602 to the data collection server 102 via the NIC 214.

In step S604, the CPU 211 determines whether the resident performs an operation to respond to the visit of the visitor via the input unit 218. In a case where the CPU 211 determines that the resident performs an operation to respond to the visit of the visitor via the input unit 218 (YES in step S604), then in step S605, the CPU 211 transmits the response information indicating that the resident responds to the visit of the visitor to the data collection server 102 via the NIC 214. In a case where a request to respond to the visit of the visitor is not received via the input unit 218, the CPU 211 determines that the resident does not respond to the visit of the visitor (NO in step S604). In this case, the processing proceeds to step S606. In step S606, the CPU 211 transmits the response information indicating that the resident does not respond to the visit of the visitor to the data collection server 102 via the NIC 214.

In step S607, the CPU 211 determines whether the resident performs an operation to unlock the door via the input unit 218. In a case where the CPU 211 determines that the resident performs an operation to unlock the door via the input unit 218 (YES in step S607), then in step S608, the CPU 211 transmits the unlocking/locking information about a control state indicating that the door is unlocked for the visitor to the data collection server 102 via the NIC 214. In a case where a request to unlock the door is not received via the input unit 218, the CPU 211 determines that the resident does not unlock the door for the visitor (NO in step S607). In this case, the processing proceeds to step S609. In step S609, the CPU 211 transmits the unlocking/locking information a control state indicating that the door is not unlocked for the visitor to the data collection server 102 via the NIC 214.

As described above, each time there is a visitor, the intercom 101 transmits the video information and the audio information acquired upon the visit of the visitor and the response information and the unlocking/locking information indicating the response of the resident to the visit of the visitor to the data collection server 102 via the NIC 214.

Next, a flow of processing performed by the data collection server 102 is described with reference to FIG. 6B. The data collection server 102 records a large amount of input data transmitted from the intercom 101 for use in learning on the HDD 205.

In step S610, it is determined whether the CPU 202 receives the video information, the audio information, the response information, and the unlocking/locking information from the intercom 101 via the NIC 206. In a case where the CPU 202 receives the video information, the audio information, the response information, and the unlocking/locking information from the intercom 101 via the NIC 206 (YES in step S610), then in step S611, the CPU 202 records the received video information, audio information, response information, and unlocking/locking information on the HDD 205. In a case where no data is received from the intercom 101 (NO in step S610), the CPU 202 continues to wait for receiving data.

In step S612, the CPU 202 reads the data stored in the HDD 205 in step S611 and transmits the data to the inference server 103 via the NIC 206. The recording processing for recording the data received from the intercom 101 on the HDD 205 and data transmission processing to the inference server 103 can be performed at the same time.

Figure 6C:
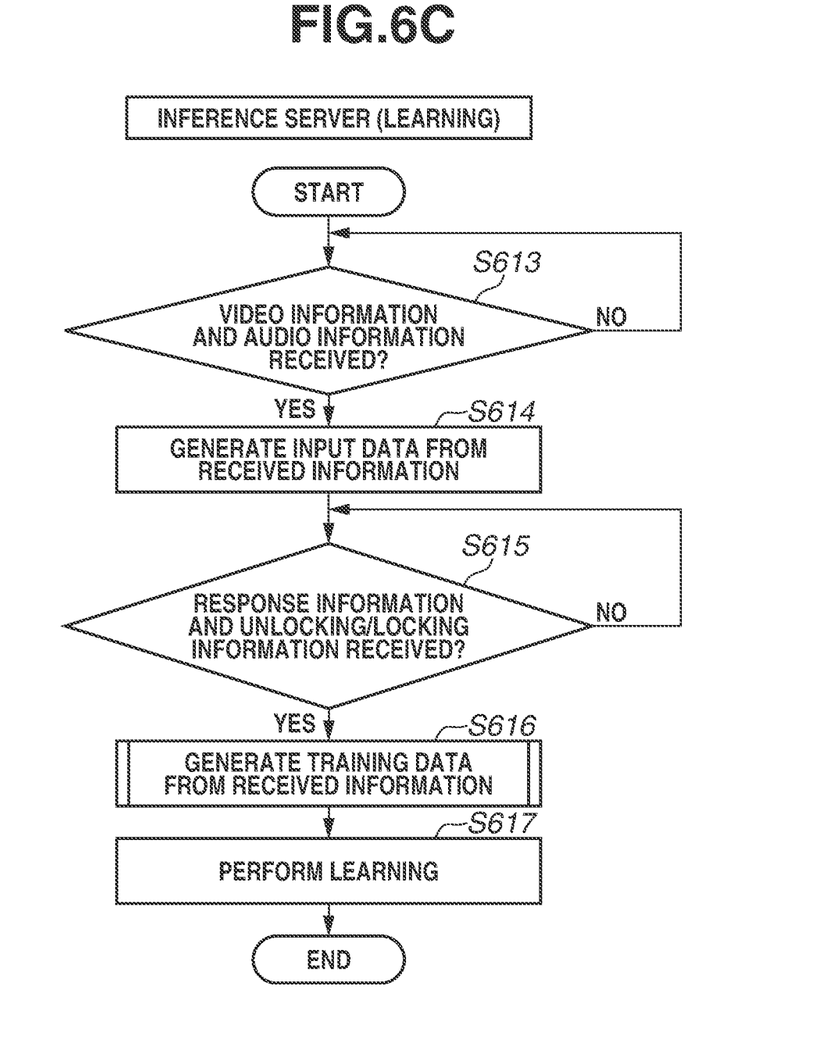

Next, a flow of processing performed by the inference server 103 is described with reference to FIG. 6C.

In step S613, it is determined whether the CPU 202 receives the video information and the audio information transmitted from the data collection server 102 via the NIC 206. In a case where the CPU 202 receives the video information and the audio information transmitted from the data collection server 102 via the NIC 206 (YES in step S613), then in step S614, the CPU 202 generates the input data for learning from the received video information and audio information. The CPU 202 analyzes the video information received from the data collection server 102 and extracts subject information. The subject information includes, for example, the face information, the body type information and the clothing information about the visitor who is the subject. The CPU 202 can extract voice information about each subject by analyzing the audio information received from the data collection server 102 together with the video information. The CPU 202 records the input data generated from analysis results of the video information and the audio information on the HDD 205. Specific examples of the input data are described below with reference to FIG. 7. In a case where no data is received from the data collection server 102 (NO in step S613), the CPU 202 continues to wait for receiving data.

In step S615, it is determined whether the CPU 202 receives the response information and the unlocking/locking information transmitted from the data collection server 102 via the NIC 206. In a case where the CPU 202 receives the response information and the unlocking/locking information transmitted from the data collection server 102 via the NIC 206 (YES in step S615), then in step S616, the CPU 202 generates the training data for learning from the received response information and unlocking/locking information. A specific flow for generating the training data is described below. In a case where no data is received from the data collection server 102 (NO in step S615), the CPU 202 continues to wait for receiving data. Processing for generating the input data and processing for generating the training data can be performed at the same time.

In step S617, the CPU 202 trains the learning model using the input data generated in step S614 and the training data generated in step S616 as the learning data. Since details of the training are described in FIG. 4, the descriptions thereof are omitted herein. The CPU 202 can write a trained model recorded on the HDD 205 over the learning model trained in step S617 and update the trained model at a predetermined timing.

Figure 6D:
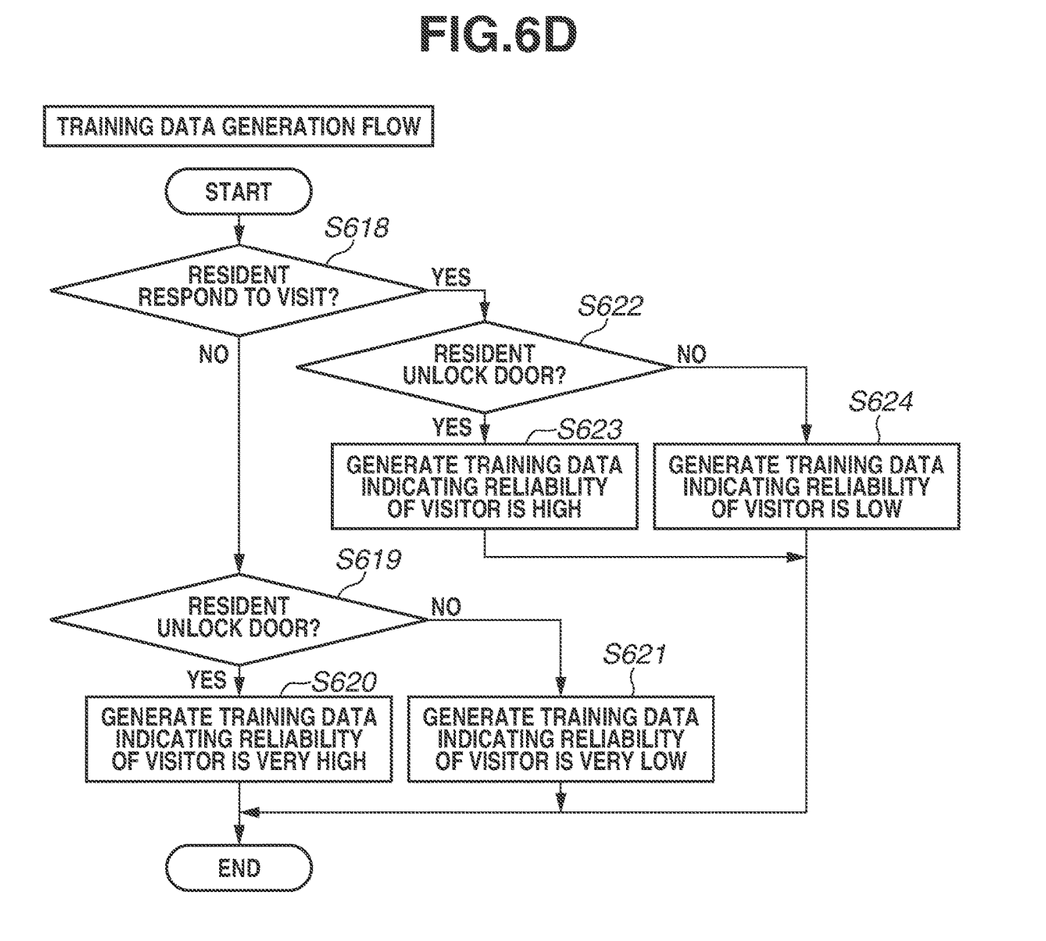

Next, the specific flow related to generation of the training data in step S616 is described with reference to FIG. 6D.

In step S618, the CPU 202 determines whether the resident responds to the visit of the visitor. In a case where the CPU 202 determines that the resident does not respond to the visit of the visitor based on the response information received from the data collection server 102 (NO in step S618), the processing in the present flowchart proceeds to step S619.

In step S619, the CPU 202 determines whether the resident unlocks the door for the visitor. In a case where the CPU 202 determines that the resident unlocks the door for the visitor based on the unlocking/locking information received from the data collection server 102 (YES in step S619), then in step S620, the CPU 202 generates the training data indicating that reliability of the visitor is very high. This is a case, for example, where it is determined that the visitor is highly likely to be a person known to and close to the resident, such as a family member or a friend of the resident, since the resident has confirmed the visitor displayed on the intercom 101 and unlocked the door without having voice communication with the visitor.

In a case where the CPU 202 determines that the resident does not unlock the door for the visitor based on the unlocking/locking information received from the data collection server 102 (NO in step S619), then in step S621, the CPU 202 generates the training data indicating that the reliability of the visitor is very low. This is a case, for example, where it is determined that it is highly likely that, for example, the resident pretends not to be at home and finds the visit of the visitor troublesome since the resident has confirmed the visitor displayed on the intercom 101 but has not even had voice communication with the visitor or unlocked the door. In this case, it is necessary to confirm that the resident is actually in the house in order to distinguish this case from a case in which the resident is not at home. While a detailed description is omitted, the confirmation processing can be realized by using, for example, information from a human detection sensor installed in the house and information from a camera or a sensor installed in each home electrical appliance.

In a case where the CPU 202 determines that the resident responds to the visit of the visitor based on the response information received from the data collection server 102 (YES in step S618), the processing in the present flowchart proceeds to step S622.

In step S622, the CPU 202 determines whether the resident unlocks the door for the visitor. In a case where the CPU 202 determines that the resident unlocks the door for the visitor based on the unlocking/locking information received from the data collection server 102 (YES in step S622), then in step S623, the CPU 202 generates the training data indicating that the reliability of the visitor is high. This is a case that, for example, the resident has unlocked the door after confirming the visitor displayed on the intercom 101 and having voice communication with the visitor. In this case, it is accordingly determined that the visitor is highly likely to be a person for whom it is safe to unlock the door for, such as a person known to or close to the resident, a family member or a friend of the resident, or a delivery person of a home-delivery service.

In a case where the CPU 202 determines that the resident does not unlock the door for the visitor based on the unlocking/locking information received from the data collection server 102 (NO in step S622), then in step S624, the CPU 202 generates the training data indicating that the reliability of the visitor is low. This is a case where, for example, it is determined that the visitor is highly likely to be an unwanted visitor, such as a sales person that the resident has no interest in since the resident has confirmed the visitor displayed on the intercom 101 and has not unlocked the door after having voice communication with the visitor.

As described above, the training data can be automatically generated from a response status of the resident indicating whether the resident responds to the visitor.

In another exemplary embodiment, the training data can be generated by adding information about a visit time to the response information and the unlocking/locking information. For example, if a time at which the resident has had voice communication with the visitor and unlocked the door is around a time when a family member usually comes home, it is possible to generate the training data indicating that the visitor is highly likely to be a family member.

In another exemplary embodiment, the training data can be generated by adding information about a visit schedule to the response information and the unlocking/locking information. For example, if a time at which the resident has had voice communication with the visitor and unlocked the door is within a designated time of delivery that the resident is expecting to receive, it is possible to generate the training data indicating that the visitor is highly likely to be a delivery person of a home-delivery service. The schedule information can be managed by the intercom 101 or the information processing apparatus. The schedule management can, for example, be realized by linking to a smartphone of the resident and obtaining the schedule information therefrom. In this case, for example, if information indicating that the resident is scheduled to be out at the time when the visitor is visiting is recorded in a schedule in the resident's smartphone, it can be possible to not generate the training data. In a case where the resident is not home, no response is made regardless of who the visitor is. If a model is trained by using such information, however, the accuracy of the model can be deteriorated. Such an issue can be avoided by taking into account the schedule information.

More accurate training data can be generated by taking into account the time information and the schedule information as described above.

In still yet another exemplary embodiment, it is possible to change weighting of the unlocking/locking information according to position information indicating an installation position of the door to be opened and closed. For example, in a case of a housing complex, there may be a door to each dwelling unit as well as a door to the entrance of the building. In this case, there may be a case where the resident accidentally unlocks the building entrance door but does not unlock the door to the dwelling unit. Accordingly, in a case where the resident unlocks the door to the dwelling unit, it is possible to generate more accurate training data by generating training data with higher reliability of the visitor than a case in which only the building entrance door is unlocked.

In still yet another exemplary embodiment, it is possible to generate the training data using response information and unlocking/locking information regarding a visit of a visitor and training data generated by an intercommunication system of another residence. Accordingly, a response status indicating whether a resident of another residence responds to a visitor can be added so that more accurate training data can be generated.

Figure 7:
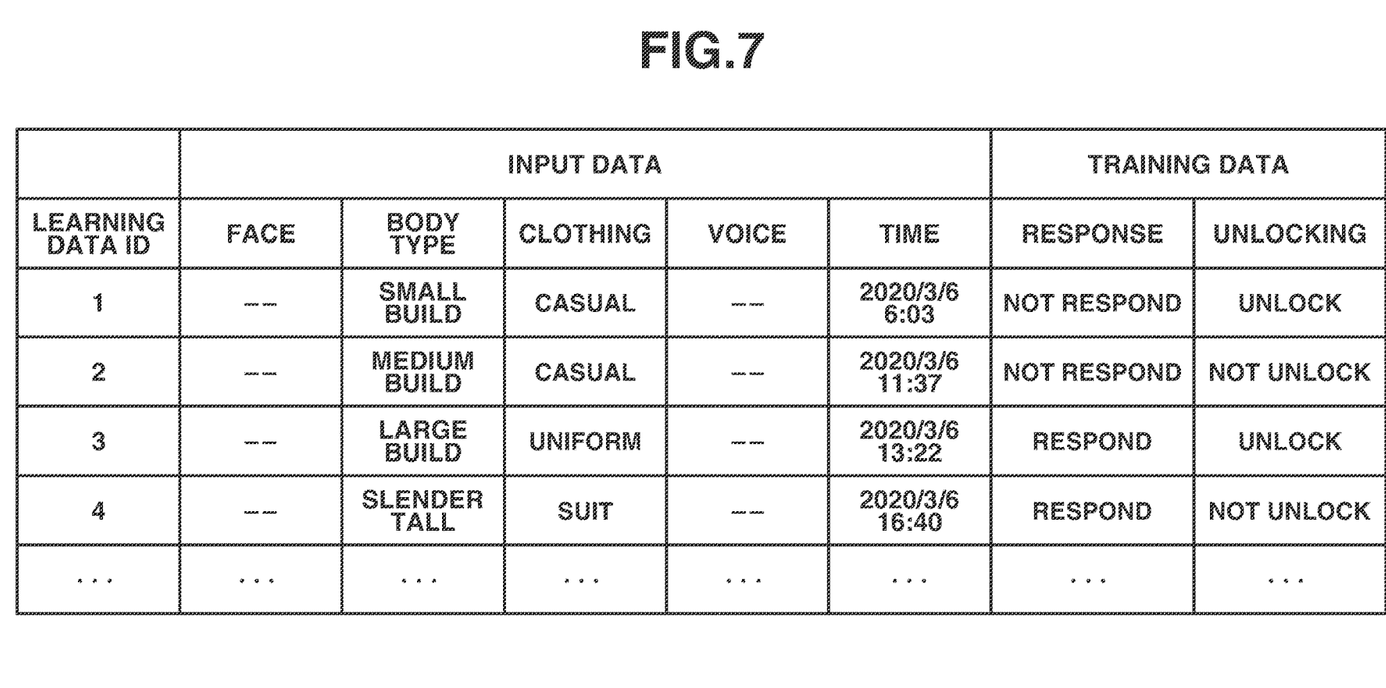
FIG. 7 illustrates an example of learning data according to an exemplary embodiment.

FIG. 7 illustrates examples of learning data including input data and training data.

First, the input data is described. Items of the input data include "face", "body type", "clothing", "voice", and "time". In FIG. 7, "face" and "voice" are not illustrated. More specifically:

"Face" is face information about a visitor detected based on the video information acquired by the image capturing unit 215 of the intercom 101.

"Body type" is body type information about a visitor detected based on the video information acquired by the image capturing unit 215 of the intercom 101.

"Clothing" is clothing information about a visitor detected based on the video information acquired by the image capturing unit 215 of the intercom 101.

"Voice" is voice information about a visitor detected based on the audio information acquired by the voice communication unit 216 of the intercom 101.

"Time" is time information at which the input data is generated.

Next, the training data is described. Items of the training data include "response" and "unlocking". More specifically:

"Response" is information indicating whether the resident responds to the visitor by operating the input unit 218 after the visit of the visitor is notified by the notification unit 219 of the intercom 101.

"Unlocking" is information indicating whether the resident unlocks the door by operating the input unit 218 after the visit of the visitor is notified by the notification unit 219 of the intercom 101.

Next, learning data identifications (IDs) 1 to 4 are sequentially described.

The learning data ID 1 includes input data of "not respond" as the response information and "unlock" as the unlocking information for a person with a predetermined face, a "small build" body type, and a predetermined voice who is wearing "casual" clothing. From the above-described input data, the learning model learns that the person has very high reliability. As the learning progresses, the inference unit 324 can infer that the person has a close relationship with the resident, such as a family member or a friend of the resident.

The learning data ID 2 includes input data of "not respond" as the response information and "not unlock" as the unlocking information for a person with a predetermined face, a "medium build" body type, and a predetermined voice who is wearing "casual" clothing. From the above-described input data, the learning model learns that the person has very low reliability. As the learning progresses, the inference unit 324 can infer that the person is unreliable and perform processing for outputting a warning display to the resident via the notification unit 219 of the intercom 101 or refraining from notifying the resident of the visit itself in a case where the person visits.

The learning data ID 3 includes input data of "respond" as the response information and "unlock" as the unlocking information for a person with a predetermined face, a "large build" body type, and a predetermined voice who is wearing a "uniform". From the above-described input data, the learning model learns that the person is reliable. As the learning progresses, the inference unit 324 can infer that the person is a delivery person of a home-delivery service or the like from the design or the logo of the "uniform" that the person is wearing.

The learning data ID 4 includes input data of "respond" as the response information and "not unlock" as the unlocking information for a person with a predetermined face, a "slender and tall" body type, and a predetermined voice who is wearing a "suit". From the above-described input data, the learning model learns that the person is unreliable.

Figure 8:
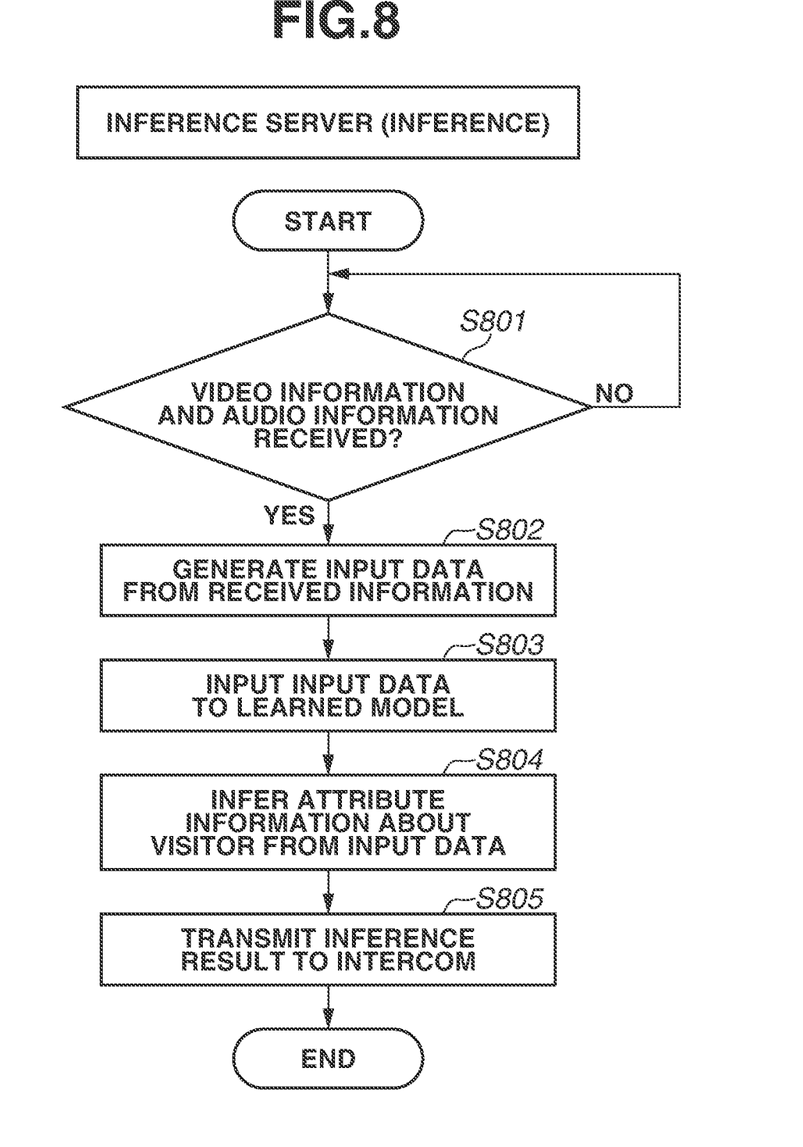
FIG. 8 is a flowchart illustrating processing in an inference phase according to an exemplary embodiment.

FIG. 8 is a flowchart illustrating a detail flow of inference processing in an inference phase.

In step S801, it is determined whether the CPU 202 receives the video information and the audio information transmitted from the data collection server 102 via the network 100. In a case where the CPU 202 receives the video information and the audio information transmitted from the data collection server 102 via the network 100 (YES in step S801), then in step S802, the CPU 202 generates input data to be used in the inference processing from the received video information and audio information. The CPU 202 analyzes the video information and the audio information received from the data collection server 102 and extracts subject information about the visitor. The CPU 202 records the input data generated from the analysis results of the video information and the audio information on the HDD 205. In a case where no data is received from the data collection server 102 (NO in step S801), the CPU 202 continues to wait for receiving data.

In step S803, the CPU 202 inputs the input data generated in step S802 to the learned model.

In step S804, the learned model infers attribute information indicating who the visitor is by using the video information and the audio information as the input data. In step S805, the CPU 202 records the inference result on the HDD 205 and transmits the inference result to the intercom 101 via the network 100.

Here, the CPU 202 can transmit the inference result to an intercom 104 of another residence via the network 100, and can also transmit to a terminal such as a smartphone (not illustrated) owned by the resident or a home electrical appliance in the residence.

As described above, according to the present exemplary embodiment, training data to be used for learning can be automatically generated.

Aspects of the present disclosure can also be realized by executing the following processing. More specifically, a program for realizing one or more functions of the above-described exemplary embodiments is supplied to a system or an apparatus via a network or a storage medium, and a computer of the system or the apparatus reads and executes the program. The computer may include one or a plurality of processors or circuits and may include a network of a plurality of separate computers and a plurality of separate processors or circuits to read and execute computer-executable instructions.

The one or a plurality of processors or circuits can include a CPU, a MPU, a GPU, an application specific integrated circuit (ASIC), and a field-programmable gate array (FPGA). The processor or the circuit can include a digital signal processor (DSP), a data flow processor (DFP), and a neural processing unit (NPU).

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2021-028814, filed Feb. 25, 2021, which is hereby incorporated by reference herein in its entirety.

What is claimed is:

1. An information processing system comprising:
an image capturing unit configured to capture an image of a visitor when the visitor comes for a visit;
a prompting unit configured to, prompt a user to input a response to a visit of a visitor, when the visitor comes to visit the user;
a detection unit configured to detect unlocking of a door;
an acquisition unit configured to acquire information about the response to the visit of the visitor input based on the prompt, the information about the input response includes information about whether the detection unit detects that the door is caused, by the user, to be unlocked or not; and
a training data generation unit configured to generate training data for a learning model by using the image of the visitor captured by the image capturing unit and the information about the type of input response provided by the user and acquired by the acquisition unit;
wherein the training data generation unit generates the training data indicating that reliability of the visitor is high in a case where the door is caused to be unlocked by the user, and generates the training data indicating that reliability of the visitor is low in a case where the door is not unlocked.

2. The information processing system according to claim 1, further comprising a voice communication unit configured to perform voice communication with the visitor,
wherein the acquisition unit acquires data related to the voice communication performed by the voice communication unit as information about the response to the visit of the visitor.

3. The information processing system according to claim 2, further comprising an inference unit configured to infer who the visitor is by using video information acquired from the image capturing unit and audio information acquired from the voice communication unit as input data.

4. The information processing system according to claim 3, wherein the inference unit infers attribute information about the visitor.

5. The information processing system according to claim 1, further comprising a notification unit configured to provide a notification of the visit of the visitor.

6. The information processing system according to claim 5, wherein, in a case where no response is made to the visitor via the voice communication unit and the door is unlocked after the notification unit provides a notification of the visit of the visitor, training data indicating that reliability of the visitor is high is generated.

7. The information processing system according to claim 5, wherein, in a case where a response is made to the visitor via the voice communication unit and the door is unlocked after the notification unit provides a notification of the visit of the visitor, training data indicating that reliability of the visitor is high is generated.

8. The information processing system according to claim 5, wherein training data to be generated in a case where no response is made to the visitor via the voice communication unit and the door is unlocked after the notification unit provides a notification of the visit of the visitor has higher reliability than that of training data to be generated in a case where a response is made to the visitor via the voice communication unit and the door is unlocked after the notification unit makes a notification of the visit of the visitor.

9. The information processing system according to claim 5, wherein, in a case where a response is made to the visitor via the voice communication unit and the door is not unlocked after the notification unit provides a notification of the visit of the visitor, training data indicating that reliability of the visitor is low is generated.

10. The information processing system according to claim 5, wherein, in a case where no response is made to the visitor via the voice communication unit and the door is not unlocked after the notification unit provides a notification of the visit of the visitor, training data indicating that reliability of the visitor is low is generated.

11. The information processing system according to claim 5, wherein the training data to be generated in a case where a response is made to the visitor via the voice communication unit and the door is not unlocked after the notification unit provides a notification of the visit of the visitor has higher reliability than that of training data to be generated in a case where the visitor is not responded to via the call unit, and the door is not unlocked after the notification unit provides a notification of the visit of the visitor.

12. The information processing system according to claim 1, further comprising a unit configured to acquire a visit time of the visitor,
wherein the training data generation unit uses the visit time of the visitor for generation of the learning model.

13. The information processing system according to claim 1, further comprising a schedule management unit configured to manage a visit schedule of the visitor,
wherein the training data generation unit uses schedule information included in the schedule management unit for generation of the learning model.

14. The information processing system according to claim 1, further comprising a determination unit configured to determine a position of a door to be unlocked as a response to the visitor,
wherein the training data generation unit uses position information about the position of the door determined by the determination unit for generation of the learning model.

15. The information processing system according to claim 1, further comprising a communication unit configured to communicate with a different intercommunication system,
wherein the training data generation unit uses training data of the different intercommunication system received by the communication unit for generation of the learning model.

16. The information processing system according to claim 1, further comprising a detection unit configured to detect unlocking of a door,
wherein the acquisition unit acquires data related to unlocking of the door with respect to the visit of the visitor as information about the response.

17. The information processing system according to claim 1, wherein, based on a user being absent, the training data generation unit does not generate training data.

18. A method for controlling an information processing system, the method comprising:
capturing an image of a visitor when the visitor comes for a visit;
prompting a user to input a response the visit by the visitor when the visitor comes to visit the user;
detecting unlocking of a door;
acquiring information about the response to the visit of the visitor input based on the prompt, the information about the input response includes information about whether the detecting detects that the door is caused, by the user, to be unlocked or not; and
generating training data for a learning model by using the captured image of the visitor and the acquired information about the type of input response provided by the user,
wherein the training data being generated indicates that the reliability of the visitor is high in a case where the door is caused to be unlocked by the user and the reliability of the visitor is low in a case where the door is not unlocked.

19. A non-transitory storage medium storing a computer readable program causing a computer to execute a method for controlling an information processing system, the method comprising:
capturing an image of a visitor when the visitor comes for a visit;
prompting a user to input a response the visit by the visitor when the visitor comes to visit the user;
detecting unlocking of a door;
acquiring information about the response to the visit of the visitor input based on the prompt, the information about the input response includes information about whether the detecting detects that the door is caused, by the user, to be unlocked or not; and
generating training data for a learning model by using the captured image of the visitor and the acquired information about the type of input response provided by the user,
wherein the training data being generated indicates that the reliability of the visitor is high in a case where the door is caused to be unlocked by the user and the reliability of the visitor is low in a case where the door is not unlocked.

* * * * *